United States Patent [19]

Gilblom et al.

[11] Patent Number: 5,747,825

[45] Date of Patent: May 5, 1998

[54] SHADOWGRAPHIC X-RAY IMAGER WITH TDI CAMERA AND PHOTO STIMULABLE PHOSPHOR PLATE

[75] Inventors: David L. Gilblom; Peter S. Castro, both of Los Altos, Calif.

[73] Assignee: Picker International, Inc., Highland Heights, Ohio

[21] Appl. No.: 979,199

[22] Filed: Nov. 20, 1992

[51] Int. Cl.$^6$ ..................................... G01N 23/04
[52] U.S. Cl. ......................................... 250/586
[58] Field of Search .................... 250/327.2 B, 327.2 D, 250/327.2 E, 327.2 F, 585, 586, 582, 589

[56] References Cited

U.S. PATENT DOCUMENTS

| | | | |
|---|---|---|---|
| 4,258,264 | 3/1981 | Kotera et al. | 250/585 |
| 4,276,473 | 6/1981 | Kato et al. | 250/327.2 |
| 4,315,318 | 2/1982 | Kato et al. | 364/515 |
| 4,369,367 | 1/1983 | Horikawa | 250/327.2 |
| 4,383,327 | 5/1983 | Kruger | 378/19 |
| 4,387,428 | 6/1983 | Ishida et al. | 364/414 |
| 4,473,513 | 9/1984 | Cusano et al. | 264/1.2 |
| 4,525,628 | 6/1985 | DiBianca et al. | 250/367 |
| 4,767,927 | 8/1988 | Ohyama et al. | 250/327.2 |
| 4,800,276 | 1/1989 | Noguchi | 250/586 |
| 4,835,386 | 5/1989 | Shimura et al. | 250/582 |
| 4,857,732 | 8/1989 | Shimura et al. | 250/582 |
| 4,873,708 | 10/1989 | Cusano et al. | 250/370.09 |
| 4,896,211 | 1/1990 | Hunt et al. | 358/106 |
| 4,922,337 | 5/1990 | Hunt et al. | 358/101 |
| 4,949,172 | 8/1990 | Hunt et al. | 358/101 |
| 4,950,906 | 8/1990 | Beerlage | 250/340.09 |
| 4,953,038 | 8/1990 | Schiebel et al. | 250/327.2 D |
| 5,040,057 | 8/1991 | Gilblom et al. | 358/101 |
| 5,180,915 | 1/1993 | Ohgoda | 250/327.2 |

FOREIGN PATENT DOCUMENTS

| | | |
|---|---|---|
| 0 237 023 A1 | 9/1987 | European Pat. Off. . |
| 0 369 585 A1 | 5/1990 | European Pat. Off. . |
| 35 29 296 A1 | 2/1986 | Germany . |
| 165642 | 8/1985 | Japan ..................... 250/585 |

OTHER PUBLICATIONS

"High Resolution Digital Radiography Utilizing CCD Planar Array", Shaber, et al., Proceedings of SPIE, Medical Imaging II: Image Formation, Detection, Processing, and Interpretation, vol. 914, Jan. 31, 1988, Newport Beach, CA, U.S.A., pp. 262–269.

"Time Delay and Integration Image Sensors", Barbe, Solid State Imaging, Noordhoff International Publishing, Leyden, The Netherlands, 1975, pp. 659–671.

"TDI Charge–Coupled Devices: Design and Applications", Wong, et al., IBM J. Res. Develop. vol. 36, No. 1, Jan. 1992, pp. 83–106.

Primary Examiner—Carolyn E. Fields
Attorney, Agent, or Firm—Fay, Sharpe, Beall, Fagan, Minnich & McKee

[57] ABSTRACT

A latent image is formed on a stimulable phosphor plate (10) by irradiating the phosphor plate with x-rays from an x-ray source (14). To develop the stimulable phosphor plate, the plate is irradiated with light of a different wavelength from developer light source (32). The light from the developer light source causes the stimulable phosphor plate to give off light of yet another characteristic wavelength. Light from the stimulable phosphor plate is filtered (38) to remove the wavelength of the developer light and focused (42) on a light sensing element (46) of a time delay and integration video camera (34). The stimulable phosphor plate and the video camera are moved relative to each other and the rate of movement is monitored (60). An array control (50) shifts rows of data or charge values along the light sensing element in coordination with movement of the stimulable phosphor plate such that the light emitted by each incremental element of the stimulable phosphor plate is integrated over a full column of detector elements of the light detector array. The time delay and integration video camera produces a video signal indicative of the latent x-ray shadowgraphic image from the stimulable phosphor plate. In one embodiment (FIG. 1), the developer is in a separate unit. In other embodiments, the time delay and integration camera and the stimulable phosphor plate are in a common darkbox such that the latent image is developed immediately and automatically to produce the video image (FIGS. 3, 4, and 5).

10 Claims, 5 Drawing Sheets

SHADOWGRAPHIC X-RAY IMAGER WITH TDI CAMERA AND PHOTO STIMULABLE PHOSPHOR PLATE

BACKGROUND OF THE INVENTION

The present invention relates to the art of diagnostic imaging. It finds particular application in conjunction with medical diagnostic imaging in which a shadowgraphic x-ray image is recorded on a stimulable phosphor plate and will be described with particular reference thereto. However, it is to be appreciated that the invention finds application in conjunction with most applications in which photographic film may be used. The invention has other applications including both delayed and real time imaging with x-rays or other penetrating radiation for industrial inspections, security inspections, and other applications in which radiation is detected after passing through an examined object and/or installations where an image intensifier or non-visible to visible radiation converter is used.

Heretofore, medical diagnostic images have been obtained by positioning a sheet of photographic film on one side of a patient and an x-ray source on the other side. Typically, a phosphor sheet is mounted adjacent the photographic film to convert received x-ray radiation into a wavelength which more readily exposes the x-ray photographic film. The x-ray source is triggered or gated for a short duration to send x-rays through the subject and expose the film. The film is subsequently developed using conventional photographic development techniques.

In another technique, rather than exposing the entire x-ray photographic film simultaneously, the x-rays are limited to a thin band. The subject and the x-ray film then move together relative to the x-ray source such that the band of x-rays sweeps along the patient and the film. The film is again developed using conventional photographic techniques.

One of the problems with this technique is that the developing process is relatively slow and large volumes of x-ray film images are produced. For many applications, such as chest x-ray screening, the film is destroyed after examination by the radiologist. Typically, the film is reprocessed to recover the silver before the carrier or matrix is destroyed. Analogously, after the developing process, the silver is typically recovered from the developer and the spent developer chemicals discarded. Due to the toxic nature of the developer chemicals, the spent developer chemicals often must be reprocessed. The reprocessing of the film and developer not only has potential environmental consequences, but is also expensive.

Others have proposed replacing the photographic film with a reusable film. See for example, U.S. Pat. No. 4,258,264. A stimulable phosphor is deposited on a suitable substrate or carrier to make a plate. The phosphor is a material whose electrons have predefined energy bands or wells. Energy of a first wavelength, e.g. x-rays, raises the electrons from a ground or discharged level to an intermediate energy level, more particularly an energy well, where the electrons remain. Like photographic film, the number of electrons raised to the well level or gray scale representation varies with the amount of received radiation of the first wavelength. The electrons stay in the well until phosphor is irradiated with energy of a second preselected wavelength, e.g. an infrared laser. Light of the second wavelength raises the electrons to a preselected high energy level in which the electrons are unstable. That is, the electrons quickly drop from a high energy level back to the initial ground energy level emitting a photon of light of a predetermined third wavelength or energy. In this manner, by irradiating the exposed phosphor with light of the second wavelength, the latent image is "developed" or recovered. Once the latent image has been recovered and converted to another recordable form, the phosphor is flooded with light to return all of the electrons to the base level in preparation for reuse.

This stimulable phosphor has been used in medical, x-ray diagnostic systems. A sheet of the stimulable phosphor is exposed to x-rays passing through the patient in the same manner that photographic x-ray film is exposed. However, the prior systems for developing the film are relatively slow and expensive.

As illustrated in U.S. Pat. Nos. 4,276,473; 4,315,318; and 4,387,428; the developer includes a laser which is swept across the stimulable film plate to expose a series of very small areas or incremental elements serially. The light emitted from each exposed incremental element is conveyed by optic light guides to a photomultiplier tube. The output of the photomultiplier tube is amplified and digitized. Each digital value represents the light output or gray scale of the corresponding incremental element viewed by the photomultiplier tube as the laser sweeps the plate. That is, each digital value corresponds to one pixel of the resultant image.

First, the system is relatively slow. Only a very small incremental area of the stimulable phosphor plate is exposed at a time by the sweeping laser beam. Moreover, the electrons do not move from the intermediate energy level of the well to the high energy level instantaneously. The longer the laser beam dwells on a given incremental area, the more completely the electrons in the intermediate energy level are converted to light, but the slower the developing procedure. Thus, either the speed, resolution, or the completeness of the developing, hence light output, is compromised.

Another disadvantage is that the prior developer systems require precise positioning of the relative parts and components. The laser beam has to follow a prescribed path closely adjacent to the optic light guide. The plate must be moved relative to the laser beam in a precise fashion such that all incremental areas are exposed, but only exposed once. This requires precision, consistency, and expensive equipment.

The present invention provides a new and improved system which overcomes the above-referenced problems and others.

SUMMARY OF THE INVENTION

In accordance with one aspect of the present invention, a stimulable phosphor sheet having a latent image is moved relative to a time delay and integration video camera and a band illumination source. The band illumination source illuminates a relatively large portion of the film corresponding to all or most of the region of the stimulable phosphor plate which is viewed by the TDI camera. In this manner, a multiplicity of pixels of the resultant image are "developed" concurrently.

As the stimulable phosphor plate is moved relative to the light source and TDI camera, light from each row of incremental areas of the stimulable phosphor plate scans along the rows of optical pick-up elements of the TDI camera. The scan rate of the TDI camera is selected such that the rows of image data are shifted along the pick-up element at the same speed that the light from each row of incremental elements of the stimulable phosphor plate shifts along the optical sensor element. This causes the light from each incremental area of the phosphor to be integrated or accumulated over an entire column of positions along the camera light sensor element.

In accordance with one implementation of the invention, the developer is a separate free-standing unit which could develop stimulable phosphor plates from a detached x-ray system or be used as a substitute for the developers of the prior art systems.

In accordance with another aspect of the present invention, the camera, light source, and phosphor plate are enclosed in a common housing that is disposed opposite from an x-ray source with room for a patient to pass therebetween. The plate and patient move relative to the x-ray source to expose the plate and form a latent image. The plate and the time delay and integration camera move past each other to develop the latent image into an electronic image representation.

In yet another implementation, the camera and a slit beam x-ray source are disposed in a fixed relationship a small distance out of alignment. The patient and phosphor plate move together such that as the phosphor plate moves out of the x-ray beam, it moves below the time delay and integration camera where it is illuminated by the light source. In this manner, the phosphor plate is read out and conversion to an electronic image is started even before the exposure is finished.

One advantage of the present invention is that it develops stimulable phosphor plates quickly. In one embodiment, the stimulable phosphor plates are developed substantially in real time.

Another advantage of the present invention is that it develops stimulable phosphor plates more completely. Light is read out from each incremental area over a longer duration enabling the image to be developed more completely.

Another advantage of the present invention is that it avoids the costs and environmental problems associated with photographic film and developers.

Another advantage of the present invention is that the signal-to-noise ratio is improved.

Another advantage of the present invention is that the output signal is a standard TV signal that is readily exported, displayed, or processed using commonly available and well-known equipment and techniques.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components and in various steps and arrangements of steps. The drawings are only for purposes of illustrating the preferred embodiments and are not to be construed as limiting the invention.

DETAILED DESCRIPTION OF THE PREFERRED EMBODIMENTS

Figure 1B:
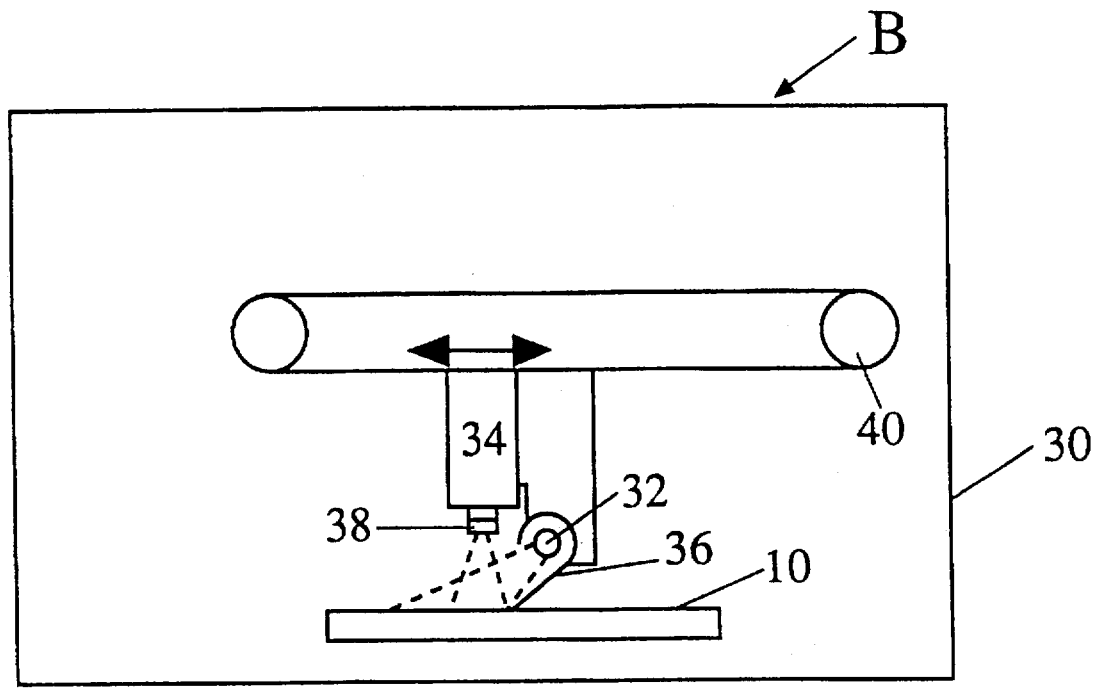
FIGS. 1A and 1B are a diagrammatic illustration of a diagnostic imaging and developer system in accordance with the present invention.
Figure 1A:
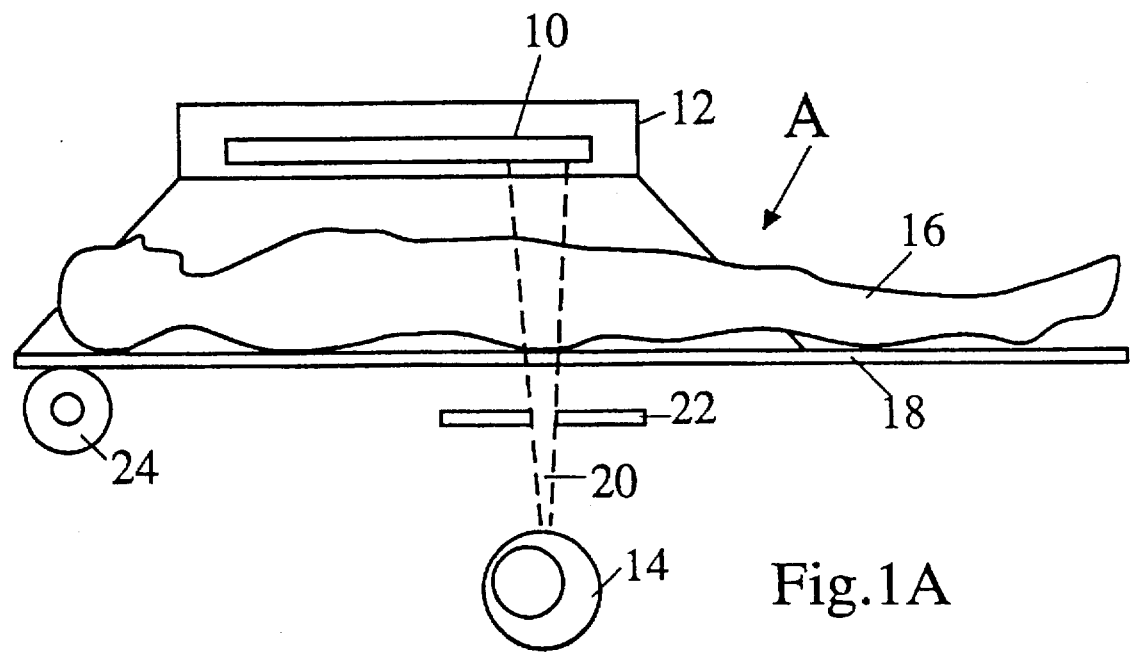

With reference to FIGS. 1A and 1B, an exposure system A includes a stimulable phosphor plate 10 which is mounted in a darkbox 12 which is sealed to ambient light. An x-ray tube or other x-ray source 14 is positioned across a patient receiving area from the stimulable phosphor plate. In the illustrated embodiment in which a patient 16 is imaged in a prone position, a patent table or couch 18 is provided for supporting the patient.

An x-ray beam 20 emitted by the x-ray source 14 is collimated by a collimator 22. In one embodiment, the collimator is such that the x-ray beam exposes all portions of the stimulable phosphor plate 10 concurrently with substantially no overscan. Although overscan is not detrimental to the imaging process, exposing a human subject to unnecessary radiation is undesirable. In the preferred embodiment, the collimator 22 limits the x-ray source to a relatively narrow beam exposing only a corresponding stripe of the stimulable phosphor plate 10. A means 24 is provided for causing the subject and the phosphor plate to move relative to the x-ray tube. In the illustrated embodiment, the relative motion means 24 includes a means for moving the patient support 18 and the darkbox 12 longitudinally at the same rate. Alternately, the patient support and the darkbox may remain stationary and the relative motion means may translate the x-ray source 14 longitudinally.

A developer system B is provided in convenient proximity to the exposure system A. The stimulable phosphor plate 10 in the darkbox 12, such as a light shielding cassette, is transported from the exposure system A to the developer system B. The developer system includes its own darkbox 30 to which the phosphor plate 10 is transferred. A light source 32 illuminates a strip of the phosphor plate which generally corresponds to a field of view of a time delay and integration video camera 34. Suitable time delay and integration cameras are illustrated in U.S. Pat. Nos. 4,922,337; 4,949,172; and 5,040,057; the disclosures of which are incorporated herein by reference. The light source 32 is selected to have the wavelength which causes the stimulable phosphor plate to emit the third wavelength radiation. A light shielding means 36 prevents portions of the stimulable phosphor plate 10 which have not as yet entered the cameras field of view from receiving illuminating radiation. A filter 38 blocks second wavelength light and light of wavelengths other than the third wavelength from reaching the camera. A relative motion means 40 causes relative motion of the camera 34 and light source 32 relative to the stimulable phosphor plate 10. In the illustrated embodiment, the light source and camera are translated longitudinally along the phosphor plate. Of course, the stimulable phosphor plate 10 may be moved relative to the camera and light source. Although the light source is shielded 36 from illuminating upstream portions of the phosphor plate, it preferably provides overscan in the downstream direction. It is advantageous for the illuminating means to provide enough illumination to the plate to assure that the plate is completely discharged with substantially all of the electrons in the ground state in preparation for the next x-ray exposure.

Figure 2:
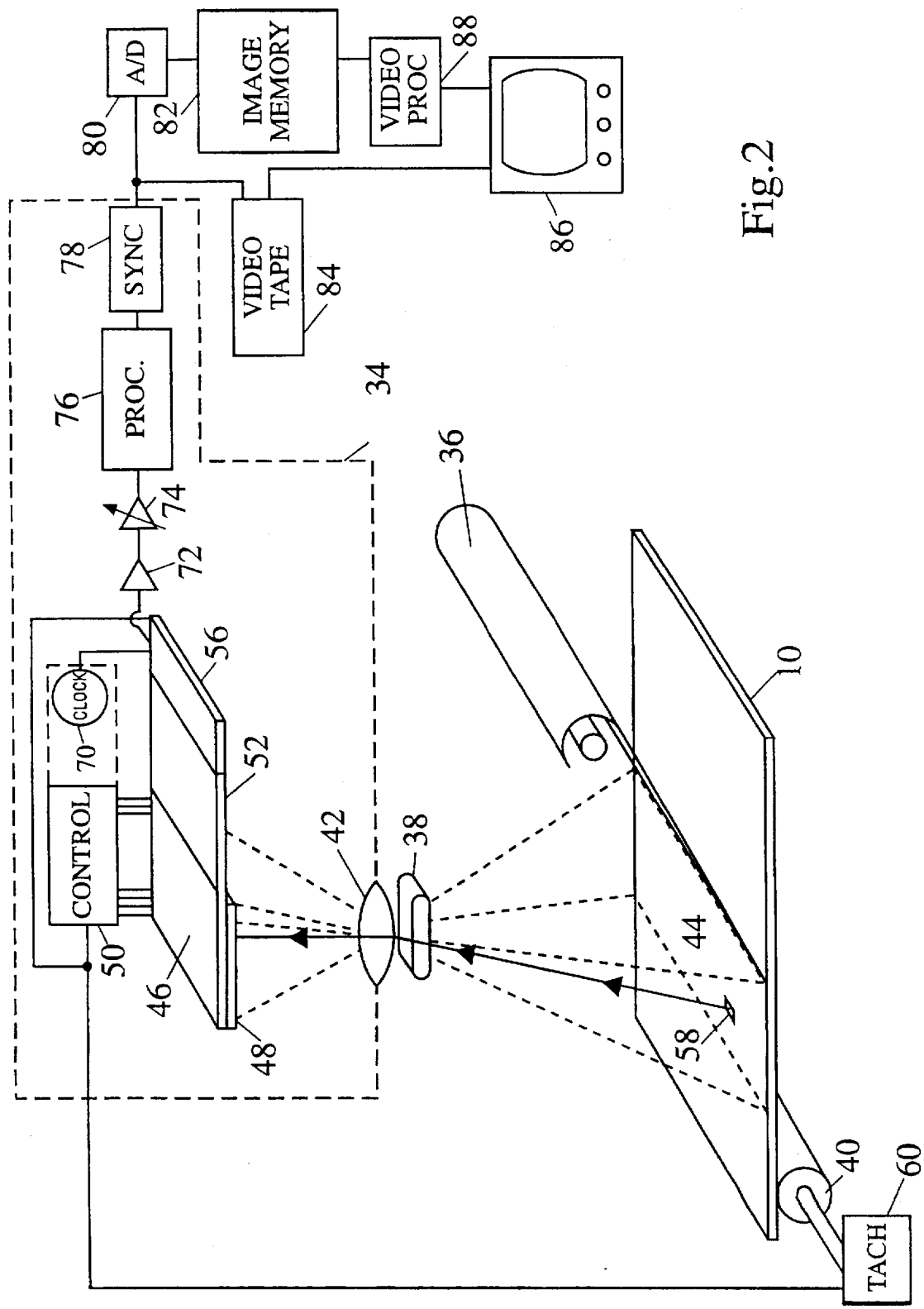
FIG. 2 is a detailed illustration of the time delay and integration video camera of FIG. 1.

With reference to FIG. 2, the time delay and integration camera 34 includes a lens 42 which focuses a preselected region 44 of the stimulable phosphor plate 10 on an imaging element 46. In the preferred embodiment, the imaging element 46 is a CCD array. The elements of the CCD array have a peak sensitivity to the third wavelength of light emitted by the stimulable phosphor plate 10. If the CCD elements have limited sensitivity to the wavelength emitted by the stimulated phosphor plate, a phosphor mask 48 is disposed immediately adjacent or layered on the sensing element 46 for converting the wavelength of light emitted by the plate 10 into a wavelength of light to which the CCD elements of the array 46 are more sensitive.

In a frame transfer CCD array type sensor, a control means 50 is periodically clocked to shift each horizontal row or line of data by one row. In a conventional RS -170 CCD video camera, the control means is clocked at a selected frame speed, e.g. a 60th of a second. Each time the frame signal is received, an internal clock causes all 244 lines of data to undergo 244 shift operations (each shift operation by one line) as fast as possible into a storage section 52. The shutter of the camera is opened to allow the light sensitive element 46 to start collecting the next frame of video data. Concurrently, a control 54 controls the storage section 52 to shift each row to a shift register 56. The shift register is clocked 600 times per row to read out horizontal rows of data at conventional video rates.

The time delay and integration camera does not shift the image data in frames at intermittent intervals, but rather shifts the rows of data continuously. Note that as the relative motion means 40 causes the stimulable phosphor plate 10 and camera 34 to undergo relative movement, light from each pixel element, such as light from pixel element 58, is swept across the CCD array 46. That is, as the plate 10 moves longitudinally, the light from element 58 moves down a column of CCD elements of the array. A tachometer means 60 monitors the relative motion between the stimulable phosphor plate and the camera 34. Each time the incremental element 58 moves the physical distance corresponding to one row on the CCD array, the tachometer produces a clock pulse which causes the control means 50 to shift the charge values one row toward the shift register 56. The exact correlation between the physical movement of the plate 10 and one row of the CCD element is determined by the magnification of the lens 42. With a higher magnification lens, the light from incremental element 58 moves to the next row, after a shorter distance of relative movement; and with a lower magnification lens, incremental element 58 moves a longer distance before the light emitted therefrom shifts one row on the CCD array 46. It will be noted that the storage portion 52 is not necessary in the preferred embodiment. It merely creates a 244 line delay before the rows of data reach the shift register 52.

In this manner, the amount of light received from each incremental spot on the stimulable phosphor plate is integrated over each of the rows of CCD elements in each column. The shift register 56 loads a row of charge values in response to each tachometer signal. A clock 70 clocks charge values out of the shift register at conventional video speeds. The clock 70 is fast enough to cause each charge value to be clocked out before the next tachometer pulse. The charge values, which are serialized by the shift register 56 represent the amount of light received from the corresponding incremental element of the phosphor plate. An amplifier 72 amplifies these signals. A gain adjustment means 74 makes an appropriate adjustment of the gain. A video processing channel 76 includes an impedance adjusting amplifier for providing a low impedance output signal, a bandpass filter for removing any vestiges of clock signal noise or the like, a user controlled gain amplifier, and a clamping means which restores the DC video. At the end of each horizontal sweep line, the clamping means shorts to a DC reference level to restore a DC level that sets the black level in the resultant image. A synchronization information means 78 adds vertical blanking and horizontal synchronization information into the video image.

The resultant video image is digitized by an analog-to-digital converter 80 stored in a digital image memory 82, stored on videotape 84, or the like. The image from the storage medium is selectively displayed on a video monitor 86. Because the image achieved with this technique has more pixels of resolution, particularly more vertical rows of data than most conventional video monitors, a video processing circuit 88 is provided. The video processing circuit under operator control selects a portion of the image in the image memory 82 for display on the video monitor, provides the appropriate vertical blanking signals, and other video information for the video monitor.

Figure 3:
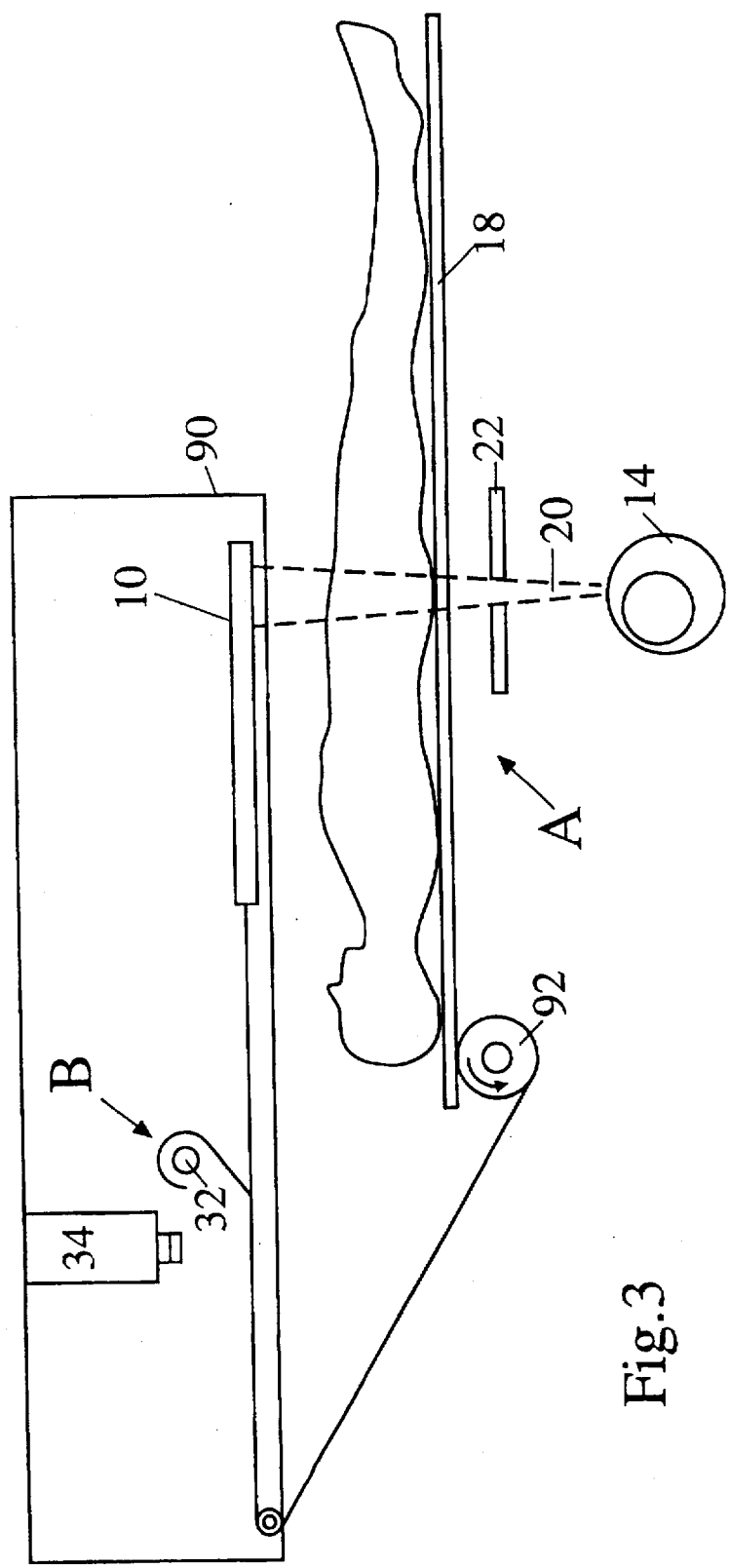
FIG. 3 is an alternate embodiment of the diagnostic scanner of FIG. 1 in which the developer is in a common housing with the stimulable phosphor plate of the exposure system.

In the embodiment of FIG. 3, the time delay and integration camera 34 and the stimulable phosphor plate 10 are enclosed in a common darkbox or light-free environment 90. A relative motion means 92 moves the patient support 18, the supported patient, and the stimulable phosphor plate 10 relative to the x-ray source 14 and relative to the TDI camera 34 and developer light 32. In this manner, the relative motion means 72 functions analogous to both relative motion means 24 and 38. In the preferred mode of operation, the relative motion means 72 causes the patient and stimulable phosphor plate 10 to move through the x-ray beam 20 and then continue moving past a TDI camera 34 and light source 32. This may be done in a continuous operation or the there may be a pause between exposure and the developer operations. Of course, rather than moving the stimulable phosphor plate under the TDI camera, the camera and developer light assembly may be moved past the stimulable phosphor plate.

Figure 4:
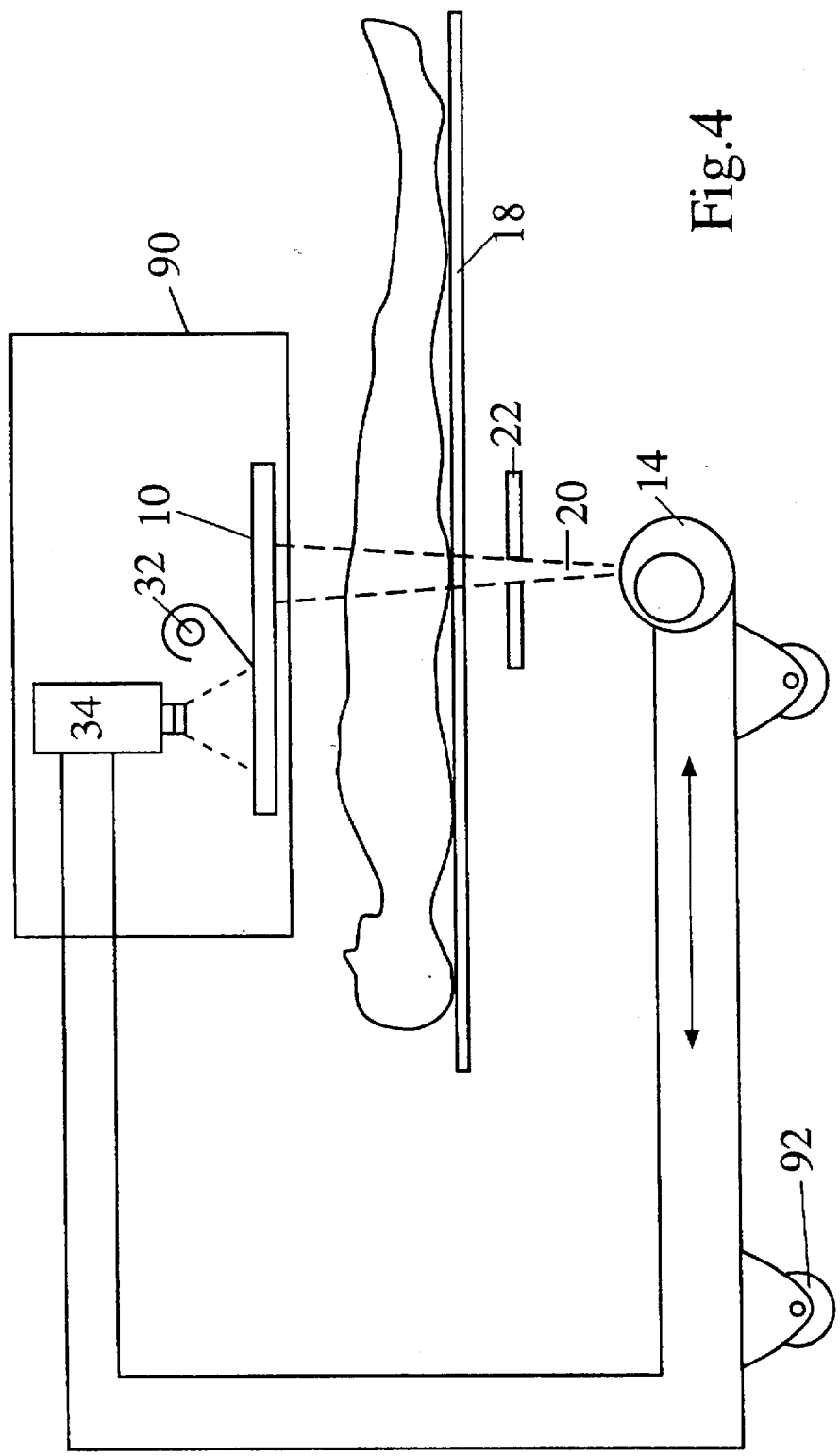
FIG. 4 is another alternate embodiment in which the x-ray image is converted to a video signal substantially in real time; and, FIG. 5 is yet another embodiment in which the stimulable phosphor plate functions analogous to a real time image intensifier.

In the embodiment of FIG. 4, a substantially real-time display of the x-ray data is provided. The TDI camera 34 and the x-ray tube 14 are mounted in a fixed, offset relative position. The offset between the x-ray source and the TDI camera are selected such that the viewing field of the TDI camera is just downstream from the exposure area of the x-ray beams on the stimulable phosphor plate 10. In this manner, as soon as the exposure of a portion of the stimulable phosphor plate is completed, that portion is moved into the viewing area of the TDI camera.

Figure 5:
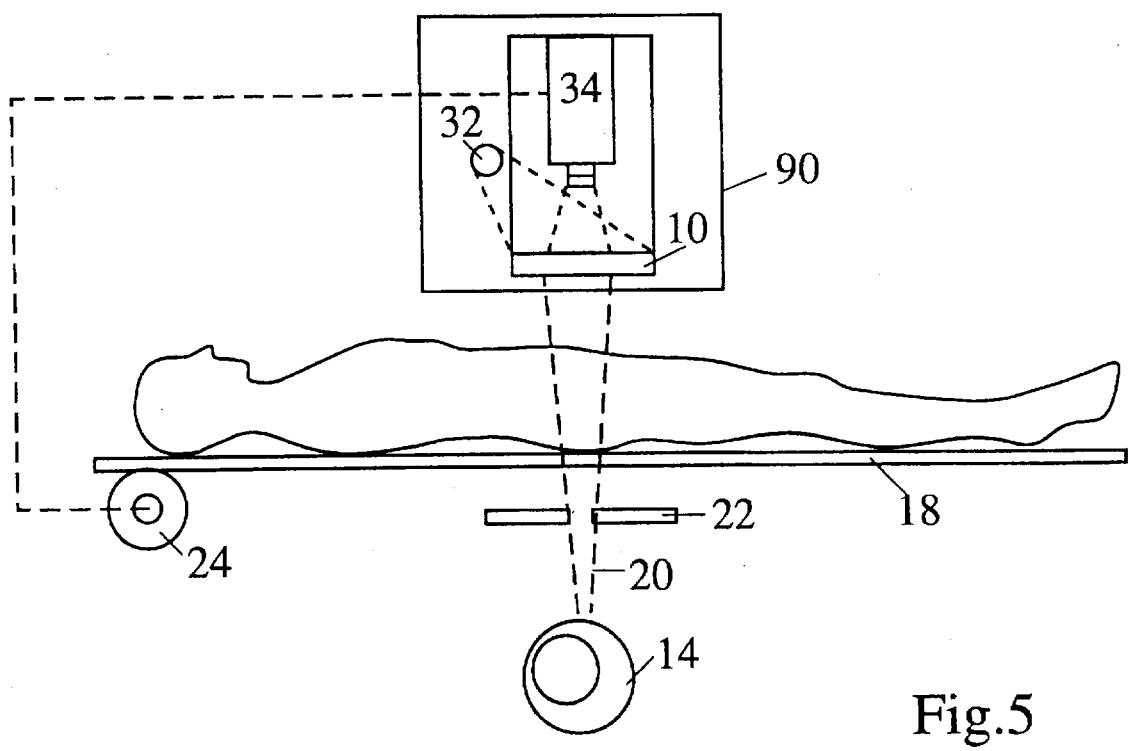

In the embodiment of FIG. 5, the stimulable phosphor plate is substantially the size of the viewing area of the TDI camera which, in turn, is substantially the same size as the exposure area from the x-ray source 14. The x-ray source, phosphor plate, and TDI camera are all fixed to each other to remain stationary or move as a unit relative to the patient and patient support 18. As the patient moves relative to the stimulable phosphor plate, the rows of data of the CCD array of the TDI camera are indexed corresponding such that each row of data from the TDI camera corresponds to a corresponding row of the patient.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiment, the invention is now claimed to be:

1. An x-ray diagnostic system comprising:
   a source of x-rays;
   a stimulable phosphor plate disposed across a subject receiving region from the x-ray source for being stimulated with x-rays therefrom to store a latent image which is stored until subsequently developed by illuminating the stimulable phosphor plate with light of a predetermined developing wavelength which causes the stored latent image to be converted into a light image of a characteristic wavelength;

a time delay and integration camera mounted displaced from the x-rays for integrating the light image from at least a first portion of a first surface of the stimulable phosphor plate, the time delay and integration camera including a light sensitive array and a lens displaced from the first surface for focusing the light image from the first surface of the stimulable phosphor plate directly onto the light sensitive array;

a means for moving the stimulable phosphor plate along a single plane from the x-ray source to the time delay and integration camera;

a filter disposed adjacent the lens for blocking light of the predetermined developing wavelength and passing light of the characteristic wavelength;

a light source for illuminating the portion of the first surface of the stimulable phosphor plate viewed by the time delay and integration camera with light of the predetermined wavelength for developing the stored latent x-ray image on the stimulable phosphor plate and causing the characteristic wavelength light image which is viewed and integrated by the time delay and integration camera.

2. An x-ray diagnostic system comprising:

a source of x-rays;

a stimulable phosphor plate having first and second surfaces on opposite sides thereof, the stimulable phosphor plate being disposed across a subject receiving region from the x-ray source such that the stimulable phosphor plate is stimulated with x-rays passing through the first surface thereof to form a latent image;

a time delay and integration camera mounted for viewing a portion of the second surface of the stimulable phosphor plate;

a means for moving the time delay and integration camera and the stimulable phosphor plate relative to each other along a common plane;

a means for producing relative movement indicative signals indicative of the relative movement of the camera and the stimulable phosphor plate for controlling the time delay and integration camera;

a light source facing the second surface of the stimulable phosphor plate for illuminating the portion of the second surface of the stimulable phosphor plate viewed by the time delay and integration camera for progressively developing the latent x-ray image by illuminating the portion of the stimulable phosphor plate with light of a predetermined wavelength which converts the latent image into an optical image which is viewed by the time delay and integration camera.

3. The system as set forth in claim 2 wherein the time delay and integration camera includes:

an array of light-sensitive elements;

a lens for focusing the light image from the portion of the second surface of the stimulable phosphor plate viewed by the time delay and integration camera onto the array of light sensitive elements;

a control means that is indexed by the relative movement indicative signals for shifting data along the light sensitive element array in coordination with the relative movement;

a shift register means for serializing rows of data from the light sensitive element array to generate an electrical signal indicative of the developed latent x-ray image.

4. The system as set forth in claim 3 further including:

a first darkbox for holding the stimulable phosphor plate across the subject receiving region from the x-ray source with the stimulable phosphor plate first surface facing the x-ray source;

a second darkbox for holding the time delay and integration camera, the light source, and the stimulable phosphor plate with the time delay and integration camera and the light source facing the second surface of the stimulable phosphor plate during developing, the first and second light boxes being separate from each other and the stimulable phosphor plate being transferable therebetween.

5. An x-ray diagnostic system comprising:

a source of x-rays;

a stimulable phosphor plate disposed across a subject receiving region from the x-ray source with a first surface facing the x-ray source, the stimulable phosphor plate being stimulated with x-rays from the x-ray source to form a latent image;

a means for causing x-rays from the source to be moved along the stimulable phosphor plate first surface in a moving band for progressively forming a latent image in the stimulable phosphor plate;

a light source for progressively illuminating a portion of a second surface of the stimulable phosphor plate in which the latent x-ray image has been formed such that the latent image adjacent the illuminated portion of the stimulable phosphor plate second surface is progressively converted to a light image;

a time delay and integration camera means mounted for viewing and integrating the progressively formed light image from the stimulable phosphor plate second surface;

a common darkbox surrounding the stimulable phosphor plate, the time delay and integration camera means, and the light source, the stimulable phosphor plate being both exposed by irradiation with the x-rays and illuminated with light from the light source within the common darkbox.

6. An x-ray diagnostic method comprising:

stimulating a stimulable phosphor plate with x-rays to form a latent image on the stimulable phosphor plate;

subsequent to forming the latent image, illuminating a first region of a first surface of the stimulable phosphor plate with light of a first wavelength that causes portions of the stimulable phosphor plate with the latent x-ray image to emit a light image of a second wavelength from the first surface;

focusing light of the second wavelength light image from the first surface of the stimulable phosphor plate onto an array of light sensitive elements while excluding light of the first wavelength from reaching the array of light sensitive elements;

moving the array of light sensitive elements and the stimulable phosphor plate relative to each other;

shifting data along the light sensitive element array in coordination with the relative movement between the light sensitive element array and the stimulable phosphor plate;

serializing rows of data from the light sensitive element array to generate an electrical signal indicative of the latent x-ray image.

7. The method as set forth in claim 6 further including:

holding the stimulable phosphor plate across an examination region from a source of the x-rays in a first darkbox;

transferring the stimulable phosphor plate to a second darkbox before the illuminating step.

8. The method as set forth in claim 6 wherein, in the stimulating step, only a second region of the stimulable phosphor plate is stimulated at a time and, in the moving step, the stimulable phosphor plate is moved relative to both a source of x-rays and the light sensitive element array such that the stimulated region moves into the first illuminated region.

9. A stimulable phosphor plate developer comprising:

a light source for illuminating a first surface of the stimulable phosphor plate for developing a portion of a latent x-ray image on the stimulable phosphor plate into a light image;

a time delay and integration camera mounted for viewing said first surface to receive the light image developed from the stimulable phosphor plate, the time delay and integration camera including:

an array of light-sensitive elements;

a lens for focusing the light image developed from the stimulable phosphor plate onto the array of light sensitive elements;

a control means for shifting data along the light sensitive element array;

a shift register means for serializing rows of data from the light sensitive element array to generate an electrical signal indicative of the latent x-ray image;

a means for moving (i) the light sensitive element array of the time delay and integration camera and the light source, and (ii) the stimulable phosphor plate relative to each other along a planar path for progressively converting portions of the latent image into the light image and the light image into the electrical signal indicative of the latent x-ray image; and a relative movement monitor means for monitoring the relative movement, the relative movement monitor means being connected with the control means such that the data is shifted in accordance with the relative movement.

10. An x-ray diagnostic method comprising:

focusing an x-ray beam on a portion of a stimulable phosphor plate, the stimulable phosphor plate forming a latent image in response to exposure to x-rays, which latent image is developed by exposing the latent image to light of a preselected first wavelength, which light of the first wavelength converts the latent image to a light image of a second wavelength;

moving the stimulable phosphor plate and the x-ray beam relative to each other such that the latent image is formed progressively along the stimulable phosphor plate;

progressively moving portions of the stimulable phosphor plate and a source of light of the first wavelength relative to each other such that the latent image is progressively converted to the light image of the second wavelength;

focusing the light image of the second wavelength onto an array of light sensitive elements without intensification while blocking the first wavelength light from reaching the light sensitive elements, the array of light sensitive elements and the stimulable phosphor plate moving relative to each other;

shifting data along the array of light sensitive elements in coordination with the relative moving between the array of light sensitive elements and the stimulable phosphor plate such that the light image of the second wavelength is integrated;

converting data from the array of light sensitive elements into an electrical signal indicative of the latent image.

* * * * *